United States Patent [19]

Gaylord et al.

[11] Patent Number: 4,598,219

[45] Date of Patent: Jul. 1, 1986

[54] SUBMERSIBLE MOTOR

[75] Inventors: F. David Gaylord, Hales Corners; Jack C. Wickersheimer, West Allis, both of Wis.

[73] Assignee: MagneTek, Inc., Milwaukee, Wis.

[21] Appl. No.: 86,325

[22] Filed: Oct. 19, 1979

[51] Int. Cl.$^4$ .............................................. H02K 5/10
[52] U.S. Cl. ...................................................... 310/87
[58] Field of Search .................................... 310/87, 89

[56] References Cited

U.S. PATENT DOCUMENTS

| | | | |
|---|---|---|---|
| 1,216,242 | 2/1917 | MacDonald | 310/54 |
| 1,768,902 | 7/1930 | Gutmann et al. | 310/87 UX |
| 2,414,532 | 1/1947 | Johns et al. | 310/89 UX |
| 2,752,517 | 6/1956 | Von Delden | 310/89 |

Primary Examiner—Donovan F. Duggan
Attorney, Agent, or Firm—John M. Haurykiewicz

[57] ABSTRACT

A submersible motor is disclosed which is adapted for submersion within an environmental liquid and which has a gas-filled housing having first and second conduits each with proximate and distal ends and communicating with the interior of the housing for permitting ingress of gas into the housing through the first conduit and for discharging gas and accumulated liquid egressing from the housing above the surface of the environmental liquid through the second conduit to provide a visual indication of leakage rate when the first conduit is connected to a source of compressed gas at a pressure in excess of the ambient pressure at the level of submersion of the motor.

3 Claims, 1 Drawing Figure

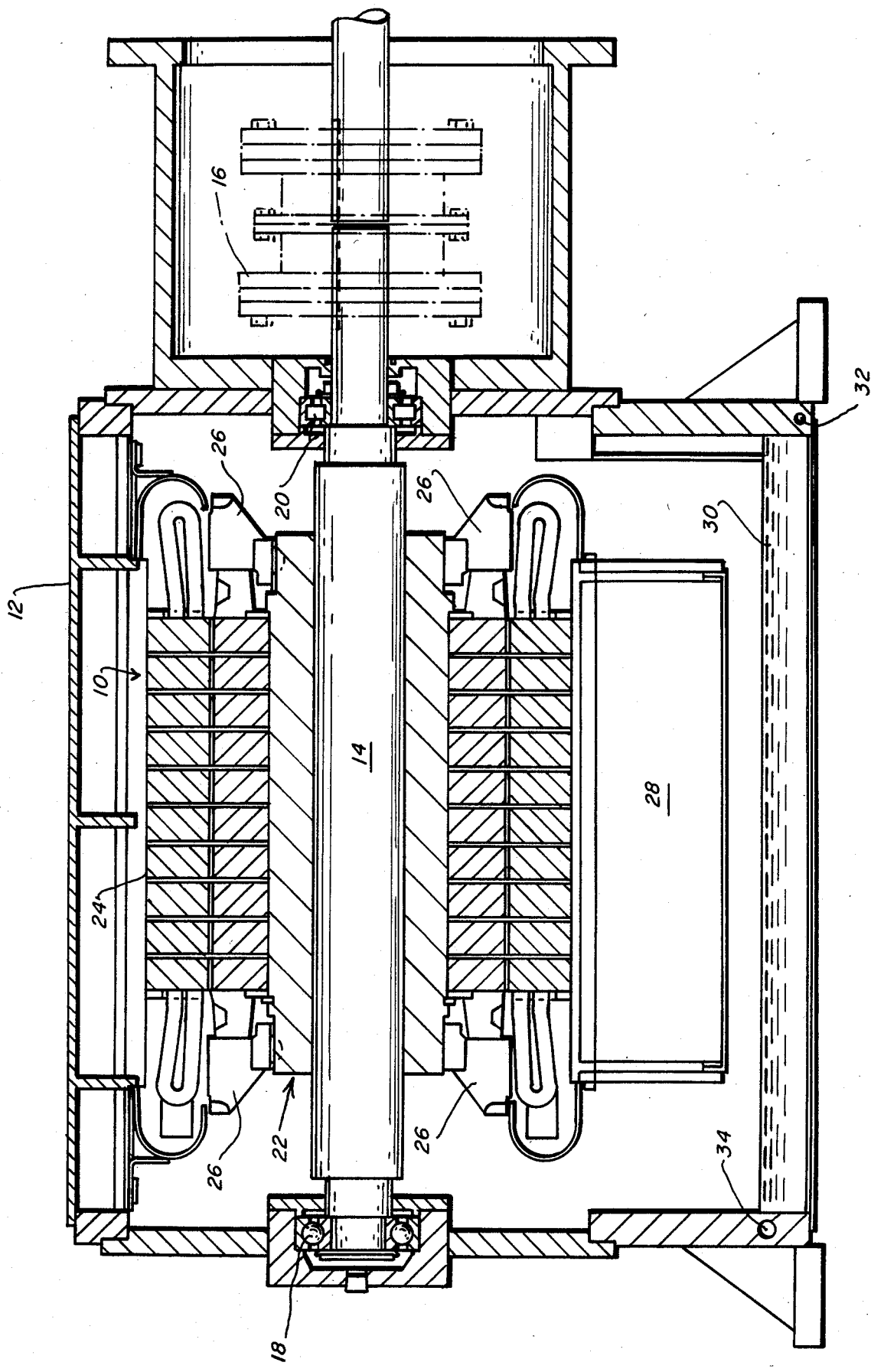

SUBMERSIBLE MOTOR

BACKGROUND OF THE INVENTION

This invention relates to electric motors and, more specifically, to motors which are adapted for submersion within a liquid. More particularly, this invention relates to submersible electric motors having means for purging any liquid which leaks into the motor housing.

Motors which are designed for submersion into a liquid generally fall into one of two categories. Some motors, such as those which are to be used in high-pressure environments including deep sea applications, permit environmental liquid to enter the motor since sealing is not feasible under those conditions. The remaining class of submersible motors are, however, sealed since it is generally better to exclude the environmental liquid if possible.

Those skilled in the art will appreciate that environmental liquids are generally corrosive and/or dirty. The prevention of corrosion necessitates the use of relatively exotic and expensive materials; the presence of solid particulate matter increases wear and drag on the moving motor parts, thereby detrimentally affecting the reliability and life of the motor.

Seals substantially reduce, but do not totally eliminate matter on the motor components. Firstly, economic considerations, manufacturing tolerances, and material limitations preclude seals from being absolutely effective.

It is accordingly preferred to employ means in addition to sealing for preventing the contamination of interior motor components by the environmental liquid. Submersible motors generally include a housing. The unoccupied space within the housing can be filled with either a liquid such as oil, or a gas such as air. Liquid is advantageous in that it is relatively incompressible and can accordingly provide some reduction in the differential between the pressures inside and outside the motor housing, thereby reducing the potential for seal failure. The presence of liquid within the housing, however, creates drag losses within the motor which increase as a cubic function of motor speed.

While the forementioned drag losses are substantially reduced by the substitution of gas for liquid in the motor housing, gas is, of course, compressible. Conventionally, submersible motors within gas-filled housings have included an expandable chamber which permits the enclosed gas to expand or contract with the pressure changes associated with changing submersion depth. The volumetric change in gas, however, is concurrent with a temperature change in the gas which must be taken into account in the structural design of the motor.

The present invention provides an air-filled submersible motor comprising a motor, a housing encompassing the motor and including sealing means for substantially preventing the leakage of environmental liquid into the housing, first conduit means for permitting the ingress of gas into the housing and having a first end positioned above the liquid surface, second conduit means for permitting the egress of gas and accumulated liquid out of the housing, and a source of compressed gas coupled to the first end of the first conduit means for supplying gas to the housing interior at a pressure which exceeds the ambient pressure at the level of submersion.

Further details are described in the following Description of the Preferred Embodiment of which the Sole FIGURE is a part.

DESCRIPTION OF THE DRAWING

The Sole FIGURE is a sectional elevation view of a submersible motor constructed in accordance with the invention.

FIELD OF THE INVENTION

The submersible motor described herein is particularly useful as a pump drive for use with dredges. For that reason, this particular application will be illustratively described although those skilled in the art will appreciate that other applications are certainly within the scope of the invention.

Dredges are commonly used for channel and port maintenance, recovering aggregates, dredging for pipeline installations and beach nourishment. While typical channel depths, for example, were previously limited to approximately 40 feet, the appearance of super cargo vessels has increased channel depth requirements to a hundred feet or more. Owing to the dynamics of the suction systems employed by dredges, these vessels have been experiencing a reduced output at these greater depths.

The dredge pump can be mounted either in the dredge hull or can be submerged. The vacuum created by the pump is used to offset the various flow-related frictional losses, lift the solids content of the slurry from the sea bottom to the pump and provide a requisite velocity in the suction line. The force required to lift the solids content of the slurry ($H_{sg}$) is mathematically related to the digging depth (DD) and the specific gravity (SG) of the slurry and water as follows:

$$H_{SG} = DD(SG_{slurry} - SG_{water})$$

Assuming that the specific gravity of the slurry is approximately 1.5, the force needed to lift the solids content of the slurry is approximately one-half of the digging depth. At 30 feet, the force is approximately 50 percent of the 30 foot vacuum which a conventional dredging pump can create. The remaining 15 feet of barometric pressure is sufficient to offset the various frictional losses.

Accordingly, a hull-mounted pump cannot provide an effective amount of suction if the dredged depth is in excess of 30 feet. A 50 foot digging depth, requiring a lifting force of 25 feet, demands that the specific gravity of the slurry be reduced in accordance with Equation 1. Consequently, the dredge operator must reduce the solids content of the dredged material in favor of greater velocity. Since the solids content represents the payload of the dredging operation, it is desirable to use submerged pumps for depths greater than 30 feet.

It is therefore preferable, for the sake of efficiency, to locate the pump-driving motor close to the pump and thereby eliminate the long drive shaft otherwise required. Since the pump in a dredging operation is operating in water which is filled with particulate matter, the problems outlined above with regard to submersible motors become particularly relevant. On the one hand, sealing the motor is not an absolute guarantee against leakage and the resulting corrosion and contamination by particulate matter. The efficiency gained by the elimination of the drive shaft is offset by the drag losses and the consequential degradation in motor reliability if the submersible motor is provided with an oil-filled housing.

DESCRIPTION OF THE PREFERRED EMBODIMENT

As shown in the FIGURE, a motor 10 is enclosed in a generally water tight housing 12. The motor 10 includes a drive shaft 14 which is adapted for coupling at 16 to a driven device such as a pump. The drive shaft 14 is supported by a ball bearing assembly 18, and a roller bearing assembly 20 at longitudinally displaced ends in a manner known in the art. A rotor assembly 22 is mounted for rotation with the drive shaft 14 and is surrounded by a stator assembly 24. The roller bearings allow for thermally induced expansion of the motor components.

A plurality of fan blades 26 are also coupled to the drive shaft 14 for rotation therewith and serve to circulate the cooling gas, such as air, within the confines of the housing. The gas may conveniently be air. The internal air stream thus formed passes through an air/water heat exchanger 28 mounted within the housing 12. The heat exchanger 28 includes inlet and outlet conduits through which the cooling water enters and exits, respectively. As is known in the art, the inlet and outlet conduits are coupled via a serpentine fluid-conducting channel within the heat exchanger 28. The water circulating within the interior of the heat exchanger 28 is heated by the air circulating across the exterior of the exchanger 28, whereby the circulating air is cooled.

A conduit 32 is shown in the lower right corner of the motor 10. The conduit 32 communicates, at one end, with the interior of the housing 12 and extends above the surface of the environmental liquid. The conduit 32 may conveniently include a flexible hose which is coupled to a nozzle extending from the housing 12.

A second conduit 34 is illustrated in the lower left corner of the FIGURE and also communicates with the interior of the housing 12. The distal end of the conduit 34, however, is coupled to a source of pressurized gas that is typically located above the surface of the environmental liquid. Naturally, in a dredging operation, the environmental liquid may be either sea water or fresh water.

A quantity of accumulated fluid 30 is shown in the FIGURE. The illustrated quantity has been exaggerated for the purposes of illustration and represents the liquid which has accumulated inside the housing because of leakage, condensation, and the like. The end of conduit 32 that is within the housing is positioned for substantial immersion in accumulated fluid. The preferable location will be easily determined by the expected orientation of the submerged motor and the knowledge that any leakage will accumulate in the lowest part of the housing.

In operation, a compressed gas such as air, is supplied to the housing enclosure via the conduit 34. The static air pressure inside the motor is thereby kept high enough so that the accumulated fluid 30 is forced out of the enclosure via the expulsion conduit 32. The diameter of the inlet conduit 34 is preferably sufficiently large to avoid any appreciable pressure drop between the compressed gas source and the housing interior. The diameter of the exhaust conduit 32, on the other hand, is preferably small enough to prevent the pressurized gas from easily bypassing the accumulated liquid and entering the of the conduit 32. Together, the large diameter of the conduit 34 and small diameter of the conduit 32 maximize the efficiency of the system.

By way of example, a $\frac{1}{8}$" diameter exhaust conduit and a $\frac{1}{4}$" inlet conduit have been satisfactorily utilized.

The gas static pressure within the housing enclosure must naturally be higher than the static fluid pressure outside the enclosure in order to expel liquid through the purging system herein described. Liquid leakage into the enclosure cannot occur while this pressure gradient exists, thereby providing redundant leakage protection in addition to the sealing arrangement commonly employed with submersible motors. If, however, liquid leaks into the enclosure as a result of a seal failure, or if condensation or leakage from the air/water heat exchanger 28 is present, the accumulating liquid will be expelled. If a temporary gas system malfunction occurs, the accumulated liquid will be expelled once the gas system operation is restored.

It may be noted that multiple conduits and valves may be provided so that the individual chambers within the housing structure can be checked for fluid as an aid to the location of any leaks. The integrity of the housing enclosure can also be checked by pressurizing the enclosure via the conduit 34 and checking for bubbles when the motor is submerged, or by trapping air pressure within the enclosure and checking for pressure decay; this latter method can be performed with the motor either submerged or surrounded by air.

An additional advantage which may become apparant to those readers skilled in the art, is that the exit conduit 32 may serve as a visual indication of leakage since the distal end of that conduit will be above the surface of the environmental liquid. A steady quantity of expelled liquid will thereby indicate the presence of a leak, thereby serving to prevent damage to the interior motor parts.

While the foregoing description is directed to the preferred embodiment of our invention, it will be understood that many variations and modifications will be obvious to those skilled in the art who have read and appreciated the foregoing description. Accordingly, it is intended that our invention be defined only by the claims appended hereto, and that these claims be given the broadest possible scope in view of the prior art.

We claim:

1. A motor assembly adapted for submersion into an environmental liquid comprising:
   a motor;
   a housing encompassing the motor and including sealing means for substantially preventing the leakage of environmental liquid into the housing;
   first conduit means for permitting into ingress of gas into the housing and having a first end positioned above the liquid surface;
   second conduit means communicating with the housing interior and positioned to discharge gas and accumulated liquid egressing therefrom above the surface of the environmental liquid to provide a visual indication of leakage rate;
   a source of compressed gas coupled to the first end of the first conduit means for supplying gas to the housing interior at a pressure which exceeds the ambient pressure at the level of submersion.

2. The assembly of claim 1 wherein the diameter of at least a portion of the second conduit means is less than that of the first conduit means.

3. The assembly of claim 2 including means for supporting the housing at an acute angle to the horizontal, whereby environmental fluid collects at the lowest region.

* * * * *